(12) United States Patent
Magens et al.

(10) Patent No.: US 10,308,489 B2
(45) Date of Patent: Jun. 4, 2019

(54) INDUSTRIAL TRUCK COMPRISING MEANS FOR SUPPRESSING AND REDUCING VIBRATIONS

(71) Applicant: Jungheinrich Aktiengesellschaft, Hamburg (DE)

(72) Inventors: Ernst-Peter Magens, Ammersbek (DE); Jürgen Schmalzl, Haimhausen (DE); Hubert Bibernell, Landshut (DE); Carsten Schöttke, Moosburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 64 days.

(21) Appl. No.: 15/631,096

(22) Filed: Jun. 23, 2017

(65) Prior Publication Data
US 2017/0369294 A1 Dec. 28, 2017

(30) Foreign Application Priority Data
Jun. 24, 2016 (DE) .................. 10 2016 211 390

(51) Int. Cl.
*B66F 9/075* (2006.01)

(52) U.S. Cl.
CPC .... *B66F 9/07586* (2013.01); *B60G 2300/022* (2013.01)

(58) Field of Classification Search
CPC ................. B66F 9/07586; B60G 2300/022
USPC ................. 414/636; 187/222; 280/43.12
See application file for complete search history.

(56) References Cited

U.S. PATENT DOCUMENTS

| | | |
|---|---|---|
| 3,561,628 A | 2/1971 | Melin |
| 3,937,346 A | 2/1976 | Van |
| 4,218,170 A | 8/1980 | Goodacre |
| 4,439,102 A | 3/1984 | Allen |
| 5,657,834 A | 8/1997 | Plaugher et al. |
| 7,736,115 B2 | 6/2010 | Lambert |
| 7,980,807 B2 | 7/2011 | Schoenauer |

(Continued)

FOREIGN PATENT DOCUMENTS

| | | |
|---|---|---|
| CN | 105668462 | 6/2016 |
| DE | 2512521 | 9/1976 |

(Continued)

OTHER PUBLICATIONS

U.S. Appl. No. 15/498,514, "Non-Final Office Action", dated Sep. 4, 2018, 13 pages.

(Continued)

*Primary Examiner* — Ruth Ilan
(74) *Attorney, Agent, or Firm* — Kilpatrick Townsend & Stockton LLP

(57) ABSTRACT

Embodiments include an industrial truck comprising a chassis, which is supported by at least two front wheels and by at least one rear wheel, a mast for a load-carrying apparatus, wherein the front wheels are rotatably arranged on wheel arms that protrude forwards from the mast support region of the chassis, and configured for suppressing and reducing vibrations, wherein at least one of the wheel arms, is split into at least two wheel arm portions, which are mounted by a bearing arrangement so as to be able to perform movements relative to one another, wherein relative movements of the wheel arm portions are influenced, in order to suppress or reduce vibrations.

21 Claims, 3 Drawing Sheets

(56) References Cited

U.S. PATENT DOCUMENTS

| | | |
|---|---|---|
| 8,078,368 B2 | 12/2011 | Hall |
| 8,944,744 B2 | 2/2015 | Kleeberger et al. |
| 9,403,667 B2 | 8/2016 | Mccabe et al. |
| 9,890,025 B2 | 2/2018 | Colantonio |
| 10,046,812 B2 | 8/2018 | Schmalzl et al. |
| 2005/0156391 A1 | 7/2005 | Krenzin et al. |
| 2006/0182588 A1 | 8/2006 | Beckett et al. |
| 2007/0116548 A1 | 5/2007 | Cooper |
| 2009/0312875 A1 | 12/2009 | Lehtonen et al. |
| 2009/0314582 A1 | 12/2009 | Meijer |
| 2015/0040481 A1 | 2/2015 | Stover et al. |
| 2016/0214659 A1 | 7/2016 | Schmalzl et al. |
| 2017/0313563 A1 | 11/2017 | Magens et al. |
| 2017/0313565 A1 | 11/2017 | Magens et al. |
| 2017/0327362 A1 | 11/2017 | Schmalzl et al. |
| 2017/0349418 A1 | 12/2017 | Schmalzl et al. |
| 2017/0369293 A1 | 12/2017 | Schmalzl et al. |

FOREIGN PATENT DOCUMENTS

| | | |
|---|---|---|
| DE | 8806324 | 8/1988 |
| DE | 3925668 | 2/1991 |
| DE | 4016497 | 11/1991 |
| DE | 4019075 | 12/1991 |
| DE | 10054789 | 5/2002 |
| DE | 10055751 | 5/2002 |
| DE | 10240851 | 5/2003 |
| DE | 102004002188 | 8/2005 |
| DE | 102004045698 | 3/2006 |
| DE | 602004001979 | 3/2007 |
| DE | 102008020592 | 10/2009 |
| DE | 102008020595 | 10/2009 |
| DE | 102013014094 | 3/2015 |
| DE | 102013113428 | 6/2015 |
| DE | 202015004375 | 4/2016 |
| DE | 102015201098 | 7/2016 |
| EP | 2368832 | 6/2013 |
| EP | 2881358 | 6/2015 |
| FR | 2243144 | 4/1975 |
| GB | 2379434 | 9/2004 |
| JP | H04130294 | 11/1992 |
| JP | 2004277068 | 10/2004 |
| JP | 2006160406 | 6/2006 |

OTHER PUBLICATIONS

U.S. Appl. No. 15/498,515, "Non-Final Office Action", dated Aug. 31, 2018, 12 pages.
U.S. Appl. No. 15/592,236, "Non-Final Office Action", dated Aug. 10, 2018, 11 pages.
German Application No. 10 2016 207 526.8, German Search Report dated Apr. 12, 2017.
German Application No. 10 2016 211 390.9, German Search Report dated May 18, 2017.
German Patent Application No. 10 2016 208 205.1, German Search Report dated Apr. 28, 2017.
German Patent Application No. 10 2016 209 893.4, Search Report dated May 15, 2017.
German Patent Application No. 10 2016 207 523.3, German Search Report dated Apr. 11, 2017.
European Patent Application No. 17168717.1, Extended European Search Report dated Sep. 29, 2017.
European Patent Application No. 17168817.9, Extended European Search Report dated Oct. 17, 2017.
European Patent Application No. 17170608.8, Extended European Search Report dated Oct. 20, 2017.
European Patent Application No. 17173979.0, Extended European Search Report dated Oct. 20, 2017.
European Patent Application No. 17177385.6, Extended European Search Report dated Nov. 22, 2017.
European Patent Application No. 17178081.0, Extended European Search Report dated Nov. 24, 2017.
German Application No. 10 2016 211 603.7, Search Report dated May 29, 2017.
U.S. Appl. No. 15/498,514, "Final Office Action", dated Feb. 11, 2019, 11 pages.
U.S. Appl. No. 15/610,753, "Non Final Office Action", dated Dec. 28, 2018, 7 pages.
U.S. Appl. No. 15/498,515, "Notice of Allowance", dated Feb. 13, 2019, 5 pages.

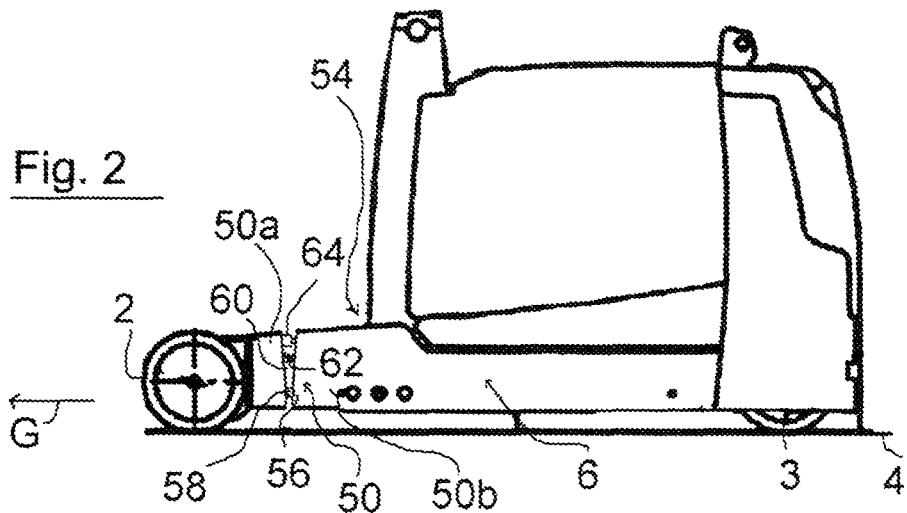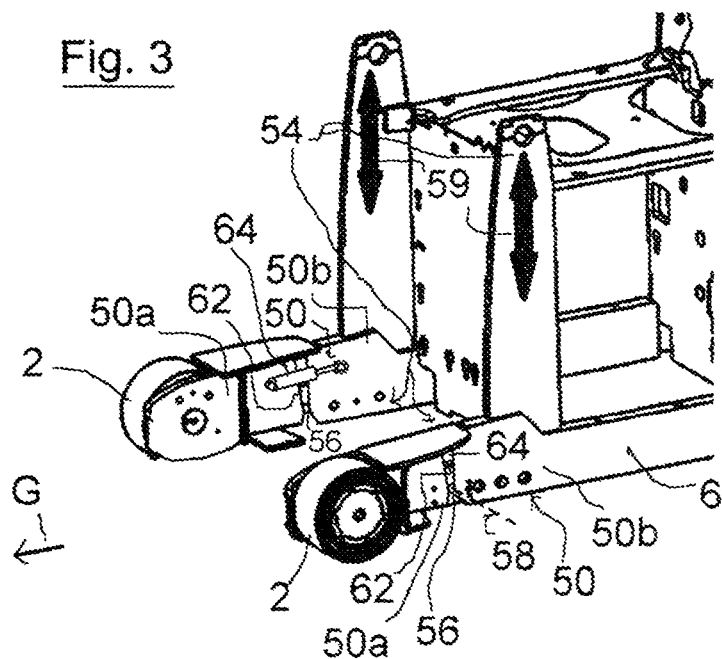

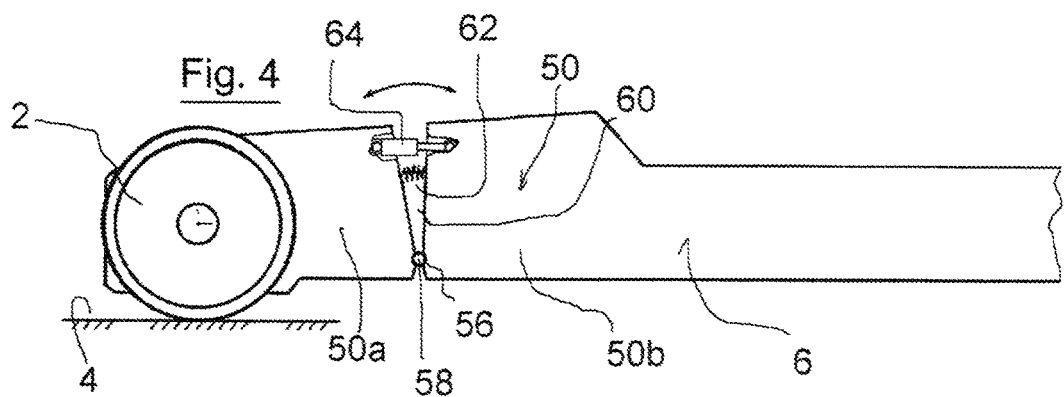
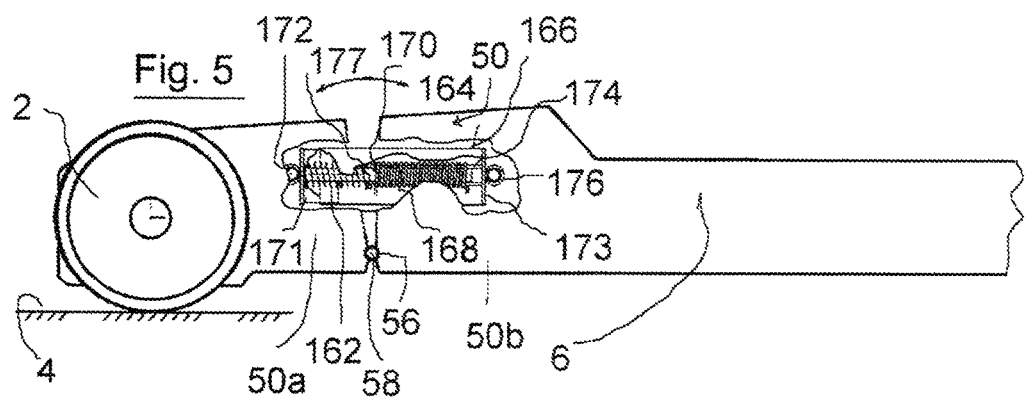
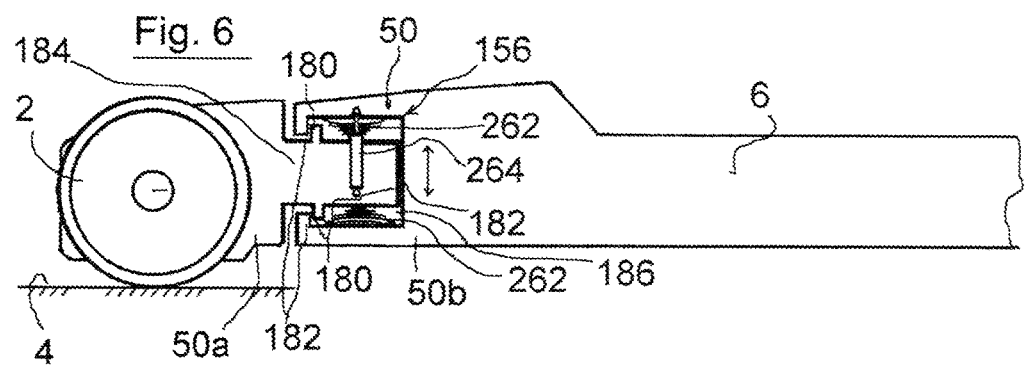

INDUSTRIAL TRUCK COMPRISING MEANS FOR SUPPRESSING AND REDUCING VIBRATIONS

CROSS REFERENCE TO RELATED APPLICATION

This application claims priority to German Patent Application No. 10 2016 211 390.9, filed in Germany on Jun. 24, 2016, the entire contents of which are hereby incorporated herein by this reference.

SUMMARY

The invention relates to an industrial truck comprising a chassis, a mast arranged on the chassis in an upright position, a load-carrying apparatus, which has at least one load-receiving means for receiving a load that is to be transported, a support structure that supports the load-carrying apparatus on the mast and can be moved, together with the load-carrying apparatus, upwards and downwards on the mast, and comprising a device for reducing vibrations.

Industrial trucks according to the invention can, for example, be forklift trucks of various designs, it being possible to use the invention particularly advantageously for stacker trucks having a centre of gravity that can be moved upwards, for example high-bay stacker trucks, in particular for tri-lateral sideloaders for order picking, in which load-carrying fork arms for lateral push operations are orientated or can be oriented transversely to the straightforward direction of travel of the industrial truck. Using such high-bay stacker trucks, the insertion and removal of whole pallets and the picking of individual items from the high bay can be combined effortlessly. High-bay stacker trucks of the type under consideration here include those in which a cab is arranged on the mast so as to be movable upwards and downwards by means of a cab carrier, a lateral push frame being provided on the front of the cab, which lateral push frame is movable upwards and downwards on the mast together with the cab and supports a load-carrying apparatus which is laterally movable back and forth, transversely to the straightforward direction of travel of the industrial truck. Since the cab and an operator located therein can be moved vertically on the mast together with the load-carrying apparatus, these types of industrial trucks are also called man-up trucks or man-up industrial trucks. In various designs of man-up industrial trucks, the mast can be extended and retracted telescopically, the cab being fastened in a height-adjustable manner to the highest extendable telescopic stage of the mast. The load-carrying apparatus that is movably guided on the lateral push frame can comprise an additional mast having load-receiving means that can move upwards and downwards thereon relative to the cab, which load-receiving means are normally load-carrying arms or a load-carrying fork having such load-carrying arms. The additional mast is arranged on a pivoting pusher and is pivotable thereon by approximately 180° about a normally vertical axis such that the load-carrying fork fastened to the additional mast in a height-adjustable manner can be pivoted out of a position in which it is laterally oriented, transversely to the straightforward direction of travel of the industrial truck, into a position in which it is oriented in an opposing lateral position. The pivoting pusher is linearly guided on the lateral push frame.

A typical task for the industrial truck is, for example, to put a pallet comprising a load located thereon in a bay for storage, the industrial truck being located in a narrow aisle between bays of a high-bay warehouse and the pallet being received on the load-carrying fork. The pallet is inserted into the bay laterally, transversely to the straightforward direction of travel (normal main direction of travel) of the industrial truck, it being assumed that the load-carrying fork is already correctly oriented on the desired storage area so as to be oriented laterally towards the bay, and the pivoting pusher, together with the additional mast provided thereon, is located in a lateral end position at the end of the lateral push frame that is remote from the bay in question. The loaded pallet can then be inserted into the bay by means of a linear lateral movement of the pivoting pusher along the lateral push frame.

It is a known problem that, in the case of industrial trucks of the kind under consideration here, vibrations on the mast, in particular vibrations having lateral vibrating components, i.e. vibrating components directed transversely to the straightforward direction of travel of the industrial truck, can occur, in particular when travelling over uneven ground.

Such vibrations are often more intense the higher the cab and its devices, which are built on at the front, have been raised on the mast and the greater the load that may be received by means of the load-carrying apparatus. Such vibrational movements can be unpleasant for an operator located in the cab and make rapid travelling in a narrow aisle as well as the placement of pallets into bays for storage and their retrieval from bays difficult or even sometimes impossible, such that the operator can only begin a placement or retrieval procedure safely after the vibrations have subsided once the industrial truck is stationary. Alternatively, the operator could in principle drive the industrial truck at a reduced speed when travelling over uneven ground in order to largely prevent excitation of vibrations. Both of these would, however, reduce productivity when working with the industrial truck.

An industrial truck of the kind mentioned at the outset, which is designed as a man-up vehicle and in which measures to reduce vibrations have already been taken, is known from EP 2 368 832 B1. Said measures consist of an assembly described as a load-receiving portion, which is movable upwards and downwards on the mast and coherently comprises the cab and the load-carrying apparatus connected thereto, being attached to the mast so as to be able to collectively perform movements relative to the mast that are transverse to the straightforward direction of travel (main direction of travel) of the industrial truck and have a lateral, i.e. normally horizontal, movement component, a separate degree of movement freedom being established for the assembly for this purpose, which is not provided for the planned operation of the industrial truck. The known industrial truck has means for damping or preventing vibrations in the relative position between the load-receiving portion and the mast, i.e. between the cab and the mast. In this case, these can be active and/or passive vibration-damping means, which are suitable for generating a force or torque between the mast and the load-receiving portion that has a component along the separate degree of movement freedom which is not provided for the planned operation of the industrial truck. In EP 2 368 832 B1, damping elements inter alia including springs are proposed for reducing vibrations, which elements counteract deflection of the mast and the assembly described as the load-receiving portion along the separate degree of movement freedom. A disadvantage of this known solution is the relatively high assembly complexity in order to attach to the mast the entire assembly, which consists of the cab and all of the load-receiving components that are vertically movable on the mast together with said cab, whilst establishing the separate degree of movement freedom which is not provided for the planned operation of the industrial truck.

The object of the invention is to provide an industrial truck of the kind mentioned at the outset, which is equipped with vibration-suppressing or vibration-reducing measures outside the region of the mast, which measures are relatively simple to achieve in terms of assembly and which allow for efficiently vibration-reducing operation.

According to the invention, an industrial truck comprising the features of claim 1 is proposed, specifically an industrial truck comprising a chassis, which is supported by at least two front wheels and by at least one rear wheel on the ground, a mast for a load-carrying apparatus, which is arranged thereon in an upright position in a mast support region of the chassis, the front wheels being rotatably arranged on wheel arms that protrude forwards from the mast support region of the chassis, and means for suppressing and reducing vibrations, at least one of the wheel arms, preferably both wheel arms, being split into at least two wheel arm portions which are mounted by means of a bearing arrangement so as to be able to perform movements relative to one another, the means for suppressing or reducing vibrations being designed or operable to influence relative movements of the wheel arm portions, in order to ensure that any impacts owing to unevenness of the ground during travel can only be passed on to the chassis and the mast by means of the wheel arms in a reduced, and absorbed and damped manner, and that any mast vibrations are damped.

A basic concept of the invention is to provide a point of movement intersection in the wheel arm concerned, preferably in both wheel arms, in each case between a wheel arm portion, which is further away from the mast support region of the chassis and comprises the front wheel concerned, and a wheel arm portion which is closer to the mast support region of the chassis or comprises said region. In this case, in order to implement this basic concept, the preferred division of the particular wheel arm into a front wheel arm portion and into a rear wheel arm portion is advantageous.

The bearing arrangement, which movably mounts the two wheel arm portions relative to one another, can comprise a pivot bearing, which allows for a pivot movement of the two wheel arm portions of a wheel arm relative to one another in a restricted region about a normally horizontal pivot axis extending transversely to the main direction of travel of the industrial truck.

In embodiments of the invention, such a degree of pivot movement freedom also has a vertical movement component, and is useful for preventing impacts and rapid, spontaneous vertical movements of the front wheels when travelling over uneven ground from being transferred unimpeded to the chassis and therefore to the mast. In this sense, the excitation of vehicle vibrations, in particular of mast vibrations, can already effectively be causally prevented to a considerable extent.

If mast vibrations do still occur, for example during lateral insertion or retrieval of loads at a great height, then the degree of pivot movement freedom of the wheel arm portions in conjunction with the means for suppressing and reducing vibrations is also useful in particular in that transverse tilting tendencies of the mast during transverse mast vibrations and the momentary weight shifts occurring in the process (i.e. alternate uneven loads of the left wheel arm and of the right wheel arm caused by the transversely vibrating mast) can be absorbed by the pivot movements of the wheel arm portions relative to one another in order to reduce kinetic energy of the vibration using the means for suppressing and reducing vibrations.

During the movement of the wheel arm portions relative to one another occurring during the absorption and damping of impacts when travelling over uneven ground on the one hand and as a response to any mast vibrations on the other hand, kinetic energy is converted into another energy form, in particular heat, as a result of the influence on said movement by the means for suppressing and reducing vibrations, in order to counteract the mast vibrations.

According to another embodiment of the invention, the bearing arrangement comprises a linear bearing, which allows for a linear movement of the two wheel arm portions of a wheel arm relative to one another, said movement comprising a vertical movement component.

In one embodiment of the industrial truck according to the invention, impacts acting on the front wheels of the industrial truck owing to unevenness of the ground on the one hand and any mast vibrations triggered by lateral insertion or retrieval procedures, for example, on the other hand, are not directly transferred by means of a rigid coupling between the front wheels and the chassis, but are absorbed and damped by the means for suppressing and reducing vibrations by means of a non-rigid and in this sense "soft" coupling allowed by the point of movement intersection.

The means for suppressing and reducing vibrations preferably have a passive and/or active damping system, which influences the movement of the wheel arm portions relative to one another.

In a very simple embodiment of a passive damping system, this can be a friction-damping system comprising a friction-damping arrangement which has a braking effect on the movement of the wheel arm portions relative to one another.

Friction-damping arrangements can have various designs, for example by providing increased bearing friction in the bearing arrangement that movably mounts the two wheel arm portions.

The range of movement of the wheel arm portions relative to one another is, for example, limited by end stops.

Passive and/or actively operable reset means can be provided, which are used to move the two wheel arm portions back into a common target zero position should they come to rest relative to one another outside of said target zero position at the end of a vibration-reducing procedure.

According to one embodiment of the invention, the damping system comprises at least one hydraulic and/or pneumatic friction-damping cylinder. Such a friction-damping cylinder comprising two cylinder chambers separated by a piston, which is axially movable therein, can be hydraulically connected, for example, such that the two cylinder chambers are short-circuited by means of a hydraulic throttle point.

Furthermore, such a friction-damping cylinder can, for example, be combined with a hydropneumatic spring-type accumulator arrangement, which counteracts displacement of the piston of the friction-damping cylinder out of a zero position. In the case of such embodiments of the invention, the damping cylinder concerned preferably directly interconnects the two wheel arm portions of a wheel arm, which portions can move relative to one another. This allows for a relatively compact and short design of the damping cylinder.

It is generally advantageous in the case of such damping systems, in particular friction-damping systems, to have at least one spring arrangement. In the present case, said spring arrangement can, for example, be designed to force the wheel arm portions at least tendentially back towards the common target zero position and to inherently preload the wheel arm portions towards the common target zero position in the event of a displacement of the wheel arm portions of a wheel arm, which can move relative to one another, out of a common target zero position.

The spring arrangement can, for example, comprise at least one mechanical spring and/or, as already described above, at least one hydropneumatic spring-type accumulator. Helical springs and/or leaf springs are preferably used as mechanical springs. The spring arrangement preferably acts directly between the wheel arm portions of a wheel arm that can move relative to one another.

According to another embodiment of the invention, the damping system comprises at least one active component, in particular at least one controllable hydraulic and/or pneumatic cylinder and/or at least one controllable electric motor, preferably a servomotor, and/or at least one electromagnet, the active component of the damping system preferably being designed to act directly between the two wheel arm portions of a wheel arm, which are movable relative to one another, in order to actively move said portions in such a manner as to suppress or reduce mast vibrations.

A control device is provided in an active system in order to control the active component(s). Furthermore, sensors can be provided which detect vibration amplitudes of the mast and/or components arranged thereon in a height-adjustable manner, it being possible for the control device to process data from said sensors in order to control the active component(s) in the sense of optimised vibration reduction. In this sense, at least one sensor can also be provided, which detects the relative movement of the wheel arm portions relative to one another.

According to one embodiment of the invention, the means for suppressing and reducing vibrations can be activatable and deactivatable.

For this purpose, a controllable locking apparatus can, for example, be provided, which, when the means for suppressing and reducing vibrations are deactivated, substantially rigidly couples the two wheel arm portions of a wheel arm to one another, and which releases the wheel arm portions from the rigid coupling when the means for suppressing and reducing vibrations are activated.

In a particularly advantageous variant of such an embodiment of the invention, the means for suppressing and reducing vibrations are automatically activatable and deactivatable depending on the particular operating state of the industrial truck and/or depending on the industrial truck being stopped in certain surroundings, for example in a narrow aisle. The means for suppressing and reducing vibrations can thus be controlled by means of a control device, for example depending on the acceleration of travel (including transverse acceleration) and/or speed of travel of the industrial truck, on the particular lifting height of the load-carrying apparatus, on the mass of the load received by the industrial truck, on the orientation of load-carrying fork arms, on impacts, for example when the ground is uneven, on the stopping place and surroundings of the industrial truck, for example when said truck is located in a narrow aisle of a high-bay warehouse, etc., sensors or other means for detecting these parameters being provided, which interact with the control device of the industrial truck that controls the means for suppressing and reducing vibrations. For example, it can thus be provided for the control device to change the "rigidity or hardness" of the coupling between the wheel arm portions depending on one or more of the aforementioned parameters. The lower the need for reducing vibrations, the more rigid or harder said coupling can be.

If the means for suppressing and reducing vibrations are only intended to suppress and reduce transverse vibrations, for example, it can be provided for said means to be controllable depending on the orientation of load-carrying fork arms and/or depending on the lifted vertical position of the load-carrying fork arms and/or only when the industrial truck has stopped in a narrow aisle, so as to be active in a narrow aisle, for example, when the load-carrying fork arms are positioned transversely to the straightforward direction of travel of the industrial truck.

BRIEF DESCRIPTION OF THE FIGURES

Embodiments of the invention are described below with reference to the figures, in which

FIG. 2 is a side view of the basic vehicle of the embodiment from FIG. 1 without a mast, cab and add-on equipment.

FIG. 3 is a perspective partial view of the chassis of the basic vehicle from FIG. 2 with additional frame parts for fastening the mast and for forming a battery compartment.

FIG. 4 is an isolated, schematic partial view from the side of a wheel arm of the embodiment according to FIGS. 1 to 3, comprising means for suppressing and reducing vibrations, the wheel arm being shown partially broken open in the region of a friction cylinder.

FIGS. 5 to 6 are isolated, schematic partial views from the side, similar to those of FIG. 4, of wheel arms which are divided, according to the invention, into wheel arm portions of further embodiments of the invention having various means for suppressing and reducing vibrations.

Figure 1:
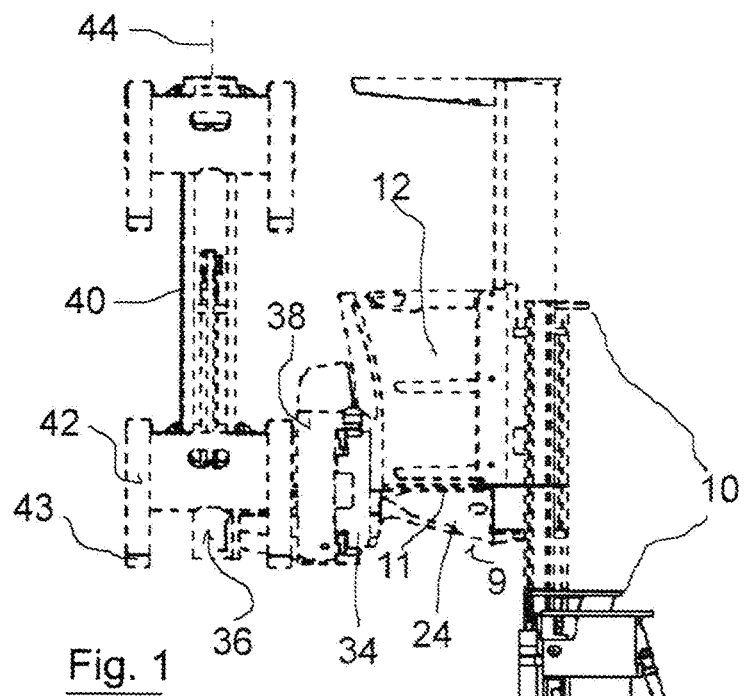
FIG. 1 is a side view of an embodiment of an industrial truck according to the invention, which is designed as a tri-lateral high-bay stacker.
Figure 1:
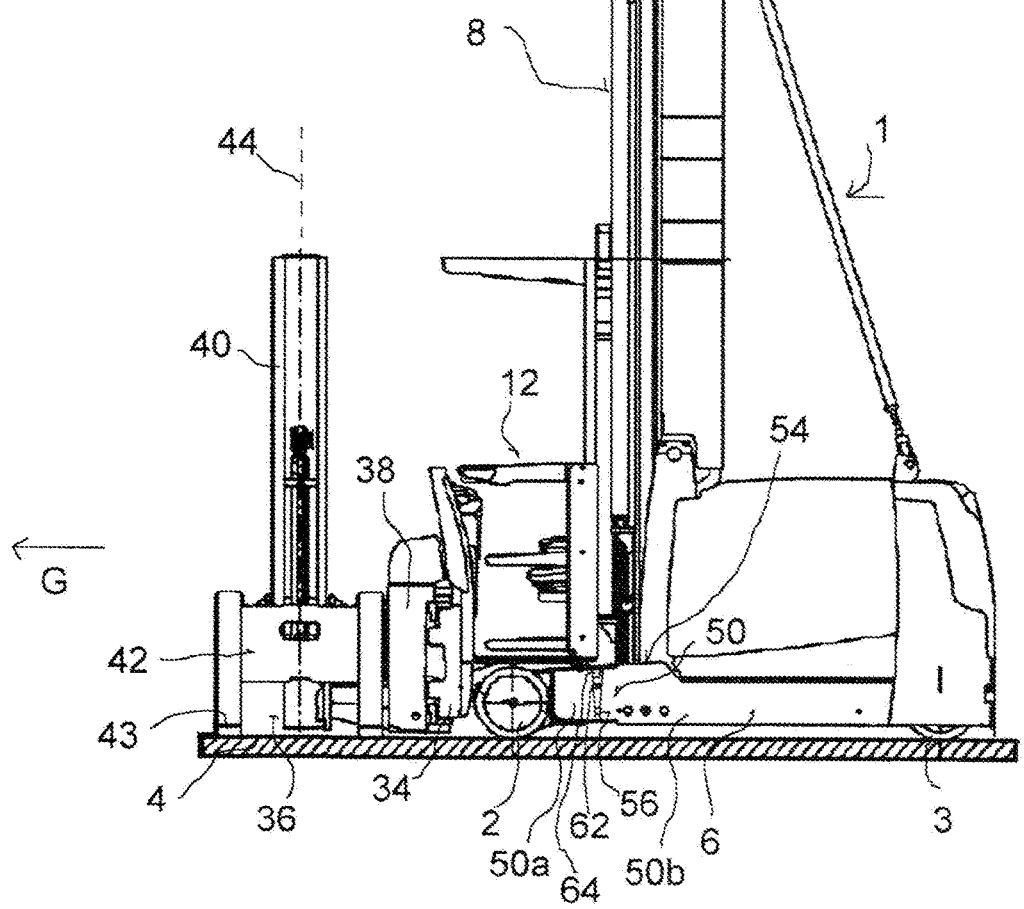

According to FIG. 1, the industrial truck 1, which is designed as a tri-lateral high-bay stacker, comprises a chassis 6 supported by means of two front wheels 2 and one rear driving wheel 3 on the ground 4, and a mast 8 fastened to the chassis 6 in an upright position. The mast 8 is constructed of multiple parts so as to be telescopically extendable, as can be seen from FIG. 1 by the extended position indicated by dashed lines. A support structure 9 in the form of a cab carrier is attached to the furthest extendable telescopic stage 10 of the mast 8 such that it can move vertically. The support structure 9 has a cantilever arrangement 24 in the form of a boom, which projects forwards from the mast 8 in the main direction of travel G of the industrial truck and braces the underneath of a platform 11 of a cab 12 and supports a lateral push frame 34 at its projecting end.

The cab 12 is designed as a lifting driver's cabin. At the front of the cab 12, the lateral push frame 34 is fixed to the cantilever arrangement 24.

DETAILED DESCRIPTION

A lateral push device 38 constructed as a pivoting pusher is arranged on the lateral push frame 34 in the form of an add-on device, so as to be laterally movable transversely to the straightforward direction of travel G of the industrial truck. The lateral push device 38 is connected to a load-carrying apparatus 36, which has an additional mast 40 arranged on the front of the lateral push device 38, on which additional mast a load-carrying fork 42 having a fork-carrying arrangement is vertically movable in the form of a load-carrying element. The additional mast 40 can be pivoted together with the load-carrying fork 42 about the vertical axis 44 between the position shown in FIG. 1, in which the load-carrying fork 42 and its load-carrying arms 43 are oriented laterally (transverse orientation to the left in relation to the straightforward direction of travel G), and a position in which the load-carrying arms 43 are oriented in an opposing lateral position (transverse orientation to the right).

The special feature of the industrial truck is means for suppressing and reducing vibrations, which are designed in particular to suppress and to dampen vibrations of the industrial truck and in particular mast vibrations having horizontal deflection components transverse to the main direction of travel G of the industrial truck (transverse vibrations). Mast vibrations and in particular also transverse vibrations of this type can be excited, for example, when the industrial truck 1 is travelling on uneven ground. In this case, without precautionary measures for at least tendentially preventing the excitation of vibrations, noticeable lateral deflections of the mast 8 can occur, in particular when said mast is a telescopically extendable mast 8, which, according to the situation shown in FIG. 1 by dashed lines, has been fully extended at the maximum lifting height of the load-carrying apparatus 36, i.e. when the centre of gravity of the mast is relatively high up, which is the case in particular when the correspondingly raised load-carrying apparatus 36 is carrying a heavy load. As already described above, such transverse vibrations of the mast are a hindrance, in particular in the case of operating the industrial truck in a narrow aisle of a high-bay warehouse, since there is a danger of collisions of the mast 8, which laterally swings out, with racks on either side of the narrow aisle.

The means for suppressing and reducing vibrations are described in more detail below.

FIG. 2 shows the basic vehicle, i.e. the industrial truck from FIG. 1, without a mast and components arranged thereon, and FIG. 3 shows the chassis 6 of the industrial truck with additional frame parts. It can be seen from FIG. 3 that the chassis 6 comprises a left wheel arm and a right wheel arm, which are each indicated by reference sign 50, the wheel arms 50, 50 projecting forwards from a mast support region 54 substantially in parallel with one another of the chassis 6 and each having a front wheel 2 at their front end.

The mast support region 54 is the region of the chassis 6, in which the mast 8 is supported on the chassis 6 in the rear region of the wheel arms 50, 50.

Each of the two wheel arms 50, 50 is split into a front wheel arm portion 50a and a rear wheel arm portion 50b, which, in the embodiment according to FIGS. 1 to 4, are mounted by means of a bearing arrangement 56, which is only schematically indicated in the figures, having a pivot bearing in such a manner that they can be pivotally moved relative to one another about a pivot axis 58, the pivot axis 58 normally extending horizontally and transversely to the main direction of travel G of the industrial truck 1. The wheel arms 50, 50 and their wheel arm portions 50a, 50b are upright sheet metal frame parts, the bearing arrangement 56 connecting the wheel arm portions 50a, 50b to one another at the separation point between the front wheel arm portion 50a and the rear wheel arm portion 50b in the lower region by means of its pivot bearing. At the particular separation point between the front wheel arm portion 50a and the rear wheel arm portion 50b, sufficient pivotal movement clearance 60 provided for the wheel arm portions 50a, 50b to be able to perform pivot movements about the pivot axis 58 in a defined pivot range when impacts occur from the front wheels owing to uneven ground and/or when vibrations of the mast 8 occur that are triggered by a number of different things.

Said pivotal movement clearance 60 is used to prevent impacts and rapid, spontaneous vertical movements of the front wheels 2, 2 while travelling over uneven ground 4 being transferred unimpeded to the chassis 6 and therefore to the mast 8. In this sense, the excitation of vehicle vibrations, in particular of mast vibrations, can already effectively be causally prevented to a considerably extent.

If mast vibrations do still occur, for example during lateral insertion or retrieval of loads at a great height, then the degree of pivot movement freedom of the wheel arm portions 50, 50 in conjunction with the means for suppressing and reducing vibrations is also useful in particular in that transverse tilting tendencies of the mast 8 having vertical force components (indicated by arrows 59 in FIG. 3) in particular during transverse mast vibrations, and the momentary weight shifts occurring in the process (i.e. alternate uneven loads of the left wheel arm 50 and of the right wheel arm 50) can be absorbed by the pivot movements of the wheel arm portions 50a, 50b in order to reduce kinetic energy of the vibration using the means for suppressing and reducing vibrations.

In particular in FIGS. 2 to 4, schematically illustrated components of a passive friction-damping arrangement of a damping system can be seen as means for suppressing and reducing vibrations. Said means are a spring arrangement 62 (illustrated schematically here as a helical spring) acting between the wheel arm portions 50a, 50b in each case and a hydraulic friction-damping cylinder 64.

The spring arrangement is designed in particular to counteract deflection of the wheel arm portions 50a, 50b out of their target zero position (shown) with resilient reset tendency.

The friction-damping cylinder 64 comprises two cylinder chambers, which are separated by a piston, that is axially movable therein, and are short circuited by means of a hydraulic throttle point (not shown). In this manner, movement of the piston is counteracted by resistance by the hydraulic fluid which flows through the throttle point under pressure.

Since the friction-damping cylinder 64 connects the two wheel arm portions 50a, 50b to one another across their separation point, stretching and compressive movements of the friction-damping cylinder 64 occur while the piston is moving during pivot movements of the wheel arm portions 50a, 50b about the pivot axis 58, as a result of which a braking effect of the pivot movements is generated. The hydraulic fluid that flows through the throttle point under pressure in the process is heated up so that kinetic energy is converted into heat. A reduction and damping of the vibrations is achieved in this manner.

Furthermore, such a friction-damping cylinder 64 can, for example, be combined with a hydropneumatic spring-type accumulator arrangement, which counteracts deflection of the piston of the friction-damping cylinder 64 out of a target zero position with resilient tendency.

It should be pointed out that, according to variants of the invention, the rigidity of the spring arrangement 62 of the damping system and/or the frictional effect of the friction-damping arrangement 64 can be controllable depending on certain operating parameters or operating conditions of the industrial truck 1, in order to modulate the vibration-damping effect as required. This also applies to other embodiments.

In a modification to the embodiment according to FIGS. 1 to 4, the friction-damping cylinder 64 could be designed and operable as an actively hydraulically activatable hydraulic cylinder or, if appropriate, be supplemented thereby. In this case, the actively hydraulically activatable hydraulic cylinder would be an active actuator for the means for reducing vibrations, which would need to be controlled so as to actively influence the movements of the wheel arm portions 50a, 50b of a wheel arm 50 relative to one another in a manner that would reduce mast vibrations. Such an actuator can also be provided within the scope of the invention in order to work towards guiding wheel arm portions 50a, 50b of a wheel arm 50, which have deflected relative to one another out of a common target zero position, back to their target zero position.

FIG. 5 shows a variant of means for suppressing and reducing vibrations, which have been modified in comparison with such means according to FIG. 4, in a manner in which they have been partially broken open. Said means are a controllable active electromagnetic arrangement 164 comprising a reset spring arrangement 162. The electromagnetic arrangement 164 comprises an electromagnetic coil 168 inside a telescopic housing 166, which is shown broken open in part, which coil has a rod-shaped ferromagnetic core 170 passing axially therethrough, which is subjected to a force to move it in an axial direction when current flows through the coil 168.

The axial end, which is on the right in FIG. 5, of the core 170 is free, whereas the axial end thereof, which is on the left in FIG. 5, is fixed to a first part 171 of the telescopic housing 166, which is held in place at the front wheel arm portion 50a by means of a joint 172. An element 174, which mounts the core 170 in an axially movable manner, is connected to a second part 173 of the telescopic housing 166, which can move relative to the first part 171, said second part 173 of the telescopic housing 166 being connected by means of a joint 176 to the rear wheel arm portion 50b. The ferromagnetic core 170 is held axially decentered in relation to the coil 168 such that it is moved electromagnetically when current flows accordingly through the coil 168. The core 170 also passes axially through the spring arrangement 162, which is designed as a helical spring, the axial ends of said spring arrangement being supported on the first part 171 of the telescopic housing 166 at one end and on a collar 177 of the bearing element 174, which is rigidly connected to the second part 173 of the telescopic housing 166 at the other end, such that the spring arrangement 162 exerts spring tension on the two parts 171,173 of the telescopic housing 166 and thus also on the two wheel arm portions 50a, 50b by means of the joints 172, 176 when the coil core 170 is pulled out of a target zero position shown in FIG. 5 and pushed further into the coil 168 or pulled further out of said coil. The current flowing through the coil 168 can be controlled by means of a control device (not shown) in order to influence a pivot movement of the two wheel arm portions 50a, 50b in a manner so as to suppress and reduce mast vibrations. Depending on the embodiment of the invention, the current flowing through the coil 168 can be controllable in terms of current strength as well as in terms of electrical polarity.

Instead of or in addition to an electromagnetic arrangement 164, hydraulic cylinders or electric motors, for example, can also be considered as adjusting means in a modification of the embodiment according to FIG. 5.

FIG. 6 shows a variant of means for suppressing and reducing vibrations, which have been modified in comparison with such means according to FIG. 4 and FIG. 5.

Furthermore, in the embodiment according to FIG. 6, the bearing arrangement 156 for movably mounting the wheel arm portions 50a, 50b also has a different design to the bearing arrangement 56 of the embodiments that have already been described.

The bearing arrangement 156 according to FIG. 6 is a linear bearing having a primary vertical degree of movement freedom. The linear bearing 156 allows for a vertical movement of the wheel arm portions 50a, 50b relative to one another, in order to absorb vibratory movements and, using the means for suppressing and reducing vibrations, to reduce said vibratory movements. In the example shown schematically and simplistically in FIG. 6, the linear bearing 156 is a sliding bearing comprising sliding surfaces 180 of the wheel arm portion 50a and comprising sliding surfaces 182 of the wheel arm portion 50b.

A certain bearing clearance is preferably provided in the case of the linear bearing 156 such that movements of the two wheel arm portions 50a, 50b relative to one another can also have a slight rotative proportion.

The front wheel arm portion 50a has a region 184, which protrudes backwards and is accommodated in a front cut-out 186 of the rear wheel arm portion 50b so as to have vertical movement clearance. Above and below the region 184, a leaf spring assembly 262 is provided in each case in the clearances which provide the movement clearance, as a component of the means for suppressing and reducing vibrations, specifically as a spring arrangement, which counteracts a deflection of the wheel arm portions 50a, 50b out of their target zero position indicated in FIG. 6 with resilient reset tendency.

The wheel arm portions 50a, 50b are connected to one another in the region of their separation point by a friction-damping cylinder 264 which, in the example according to FIG. 6, is vertically arranged on the outside of the particular wheel arm 50. In principle, the friction-damping cylinder 264 has the same function as the friction-damping cylinder 64 in the embodiment according to FIGS. 1 to 4, specifically to have a braking effect on movements of the wheel arm portions 50a, 50b relative to one another, in order to suppress vibration excitation as much as possible and to reduce vibratory kinetic energy and to convert it into heat.

The friction-damping cylinder 264 can, for example, be combined with a hydropneumatic spring-type accumulator arrangement, which resiliently counteracts deflection of the wheel arm portions 50a, 50b out of their relative target zero position.

As has already been described with reference to the embodiment according to FIGS. 1 to 4, the friction-damping cylinder 264 of the embodiment according to FIG. 6 could also be designed and operable as an actively hydraulically activatable hydraulic cylinder or, if appropriate, be supplemented thereby. In this case, the actively hydraulically activatable hydraulic cylinder would be an active actuator of the means for suppressing and reducing vibrations, which would need to be controlled so as to actively influence the movements of the wheel arm portions 50a, 50b of a particular wheel arm 50 relative to one another in a manner that would suppress and reduce mast vibrations. Within the scope of the invention, such an actuator can also be provided to work towards guiding wheel arm portions 50a, 50b of a wheel arm 50, which have deflected relative to one another out of a common target zero position, back to their target zero position.

The means for suppressing and reducing vibrations can also be deactivated in a blocking manner in all the embodiments, in order to rigidly couple the wheel arm portions 50a, 50b of a wheel arm to one another as required.

Furthermore, it should also be noted that the articulated connection between the friction-damping cylinders 64 and 264 and the wheel arm portions 50a, 50b allows for a certain degree of compensatory clearance such that the cylinders 64 and 264 are not subject to any bending strain if possible during movements of the wheel arm portions 50a, 50b relative to one another. This also applies to the electromagnetic arrangement 164 in FIG. 5.

Within the scope of the invention, the "hardness" or "rigidity" of the coupling between the wheel arm portions 50a, 50b can be modulated as required. This comes into question in particular when using controlled active means for suppressing and reducing vibrations.

A control device is provided in active vibration-damping systems according to the invention in order to control the active components. Furthermore, sensors can be provided which, for example, detect the vibration amplitudes of the mast or components arranged thereon in a height-adjustable manner, it being possible for the control device to process data from said sensors in order to control the active components in the sense of optimised vibration suppression and vibration reduction. In this sense, sensors can also be provided which detect the relative movement of the wheel arm portions 50a, 50b.

It should be pointed out that an industrial truck according to the invention can have a plurality of means for suppressing and reducing vibrations, it being possible for these means to be accommodated at different points. These means can be active and/or passive vibration-reducing systems.

The invention claimed is:

1. An industrial truck comprising:
a chassis, which is supported by at least two front wheels and by at least one rear wheel on the ground;
a mast for a load-carrying apparatus, which is arranged in an upright position thereon in a mast support region of the chassis, the front wheels being rotatably arranged on wheel arms which protrude forwards from the mast support region of the chassis; and
a means for suppressing and reducing vibrations,
wherein:
at least one of the wheel arms is split into at least two wheel arm portions, which are mounted by means of a bearing arrangement such that the at least two wheel arm portions are capable of performing movements relative to one another, and
the means for suppressing and reducing vibrations being designed or operable to influence relative movements of the at least two wheel arm portions, such that impacts owing to unevenness of the ground during travel are passed on to the chassis and the mast by means of the wheel arms in a reduced, absorbed, or damped manner, and such that any mast vibrations are damped,
wherein each of the wheel arms is split such that a first wheel arm portion forms a front wheel arm portion comprising the front wheels and being further away from the mast support region, and a second wheel arm portion forms a rear wheel arm portion comprising the mast support region or being closer to the mast support region, wherein the front wheels are further away from the mast support region than any part of the second wheel arm portion.

2. The industrial truck according to claim 1, wherein the means for reducing vibrations comprises a damping system capable of influencing movements of the two wheel arm portions relative to one another, wherein the damping system has an articulated connection to the front wheel arm portion and to the rear wheel arm portion, wherein the damping system is a passive damping system or an active damping system.

3. The industrial truck according to claim 2, wherein the damping system comprises a friction-damping arrangement.

4. The industrial truck according to claim 2, wherein the damping system comprises at least one of either a hydraulic friction-damping cylinder or a pneumatic friction-damping cylinder.

5. The industrial truck according to claim 4, wherein the at least one hydraulic friction-damping cylinder or pneumatic friction-damping cylinder interconnects the at least two wheel arm portions that are movable relative to one another.

6. The industrial truck according to claim 2, wherein the damping system comprises at least one spring arrangement.

7. The industrial truck according to claim 6, wherein the spring arrangement comprises at least one of either a mechanical spring arrangement or a hydropneumatic spring arrangement.

8. The industrial truck according to claim 6, wherein the spring arrangement interconnects the at least two wheel arm portions that are movable relative to one another.

9. The industrial truck according to claim 2, wherein the damping system comprises at least one of an active component, a controllable electric motor, or an electromagnetic arrangement.

10. The industrial truck according to claim 9, wherein the damping system comprises at least one active component, and the at least one active component is either a controllable hydraulic cylinder or a controllable pneumatic cylinder.

11. The industrial truck according to claim 9, wherein the damping system comprises at least one controllable electric motor, and the at least one controllable electric motor is a servomotor.

12. The industrial truck according to claim 9, wherein the active component of the damping system interconnects the at least two wheel arm portions that are movable relative to one another.

13. The industrial truck according to claim 2, wherein the bearing arrangement comprises a pivot bearing, which allows for a pivot movement of the at least two wheel arm portions relative to one another about a normally horizontal pivot axis extending transversely to a main direction of travel of the industrial truck, wherein the two wheel arm portions are connected to each other only via the pivot bearing and the damping system.

14. The industrial truck according to claim 2, wherein the bearing arrangement comprises a linear bearing, which allows for a linear movement of the at least two wheel arm portions relative to one another, the linear movement having a vertical movement component, wherein the two wheel arm portions are connected to each other only via the linear bearing and the damping system.

15. The industrial truck according to claim 1, wherein the bearing arrangement comprises a pivot bearing, which allows for a pivot movement of the at least two wheel arm portions relative to one another about a normally horizontal pivot axis extending transversely to a main direction of travel of the industrial truck.

16. The industrial truck according to claim 1, wherein the bearing arrangement comprises a linear bearing, which allows for a linear movement of the at least two wheel arm portions relative to one another, the linear movement having a vertical movement component.

17. The industrial truck according to claim 1, wherein the means for reducing vibrations is operable to be activated or deactivated.

18. The industrial truck according to claim 17, wherein the means for reducing vibrations is operable to be automatically activated or deactivated depending on an operating state of the industrial truck.

19. The industrial truck according to claim 17, wherein the means for reducing vibrations is operable to be automatically activated or deactivated depending on surroundings of the industrial truck.

20. The industrial truck according to claim 17, wherein the means for reducing vibrations is operable to be automatically activated when a lifting height of the load-carrying apparatus is greater than a predetermined height or deactivated when the lifting height of the load-carrying apparatus is smaller than the predetermined height depending on an operating state of the industrial truck.

21. The industrial truck according to claim 1, wherein at least some part of the first wheel arm portion is further away from the mast support region than any part of the second wheel arm portion and a second part of the first wheel arm portion is accommodated in a front cut-out of the second wheel arm portion.

* * * * *